3,452,997
Patented July 1, 1969

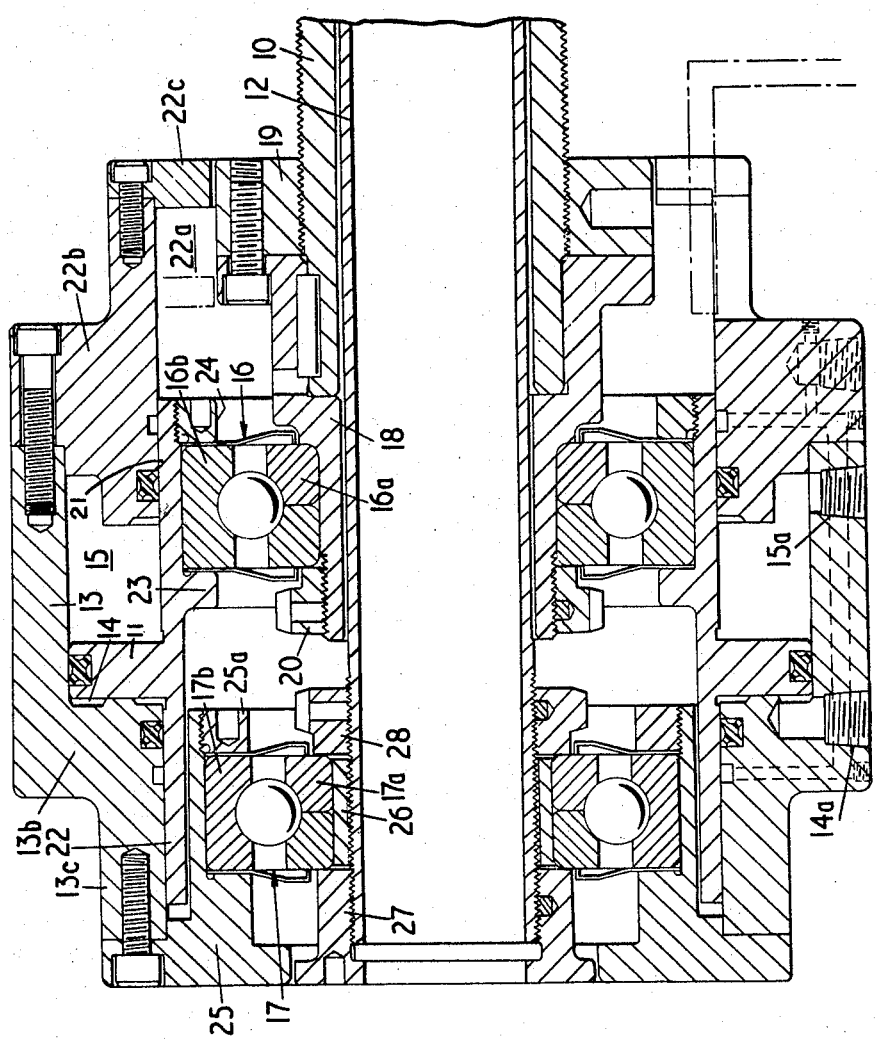

3,452,997
LATHE CHUCKING EQUIPMENT

Donald Macpherson Blackburn, Johnstone, Scotland, assignor to Wickman Lang Limited (formerly known as John Lang & Sons Limited), Johnstone, Renfrewshire, Scotland
Filed Nov. 14, 1966, Ser. No. 594,211
Claims priority, application Great Britain, Nov. 12, 1965, 48,229/65
Int. Cl. B23b 31/30; F01b 15/02
U.S. Cl. 279—4  1 Claim

ABSTRACT OF THE DISCLOSURE

Apparatus to reciprocate the draw tube in a spindle. A cylinder contains a piston which has piston rods extending from each face. On the end of the spindle is fastened a sleeve and by bearings the sleeve is rotatively secured to one surrounding piston rod. Thus the spindle supports the piston in a fixed axial position. A flanged end housing extends into the other piston rod and is rotatably secured to the end of the draw tube. Further the end housing is fastened to the cylinder. Pressure fluid can enter through ports in the cylinder to either side of the piston. Such pressure serving to reciprocate the cylinder and connecting draw bar.

---

This invention has reference to lathe chucking equipment wherein the chuck is rotated by a tubular lathe spindle and caused to grip and release the work piece by the operation of a draw tube extending through the bore of the lathe spindle, power operated means being provided to move the draw tube axially within the lathe spindle to effect such operations.

It has heretofore been proposed to provide lathe chucking equipment of the kind set forth with a unit to actuate the draw tube comprising a cylinder and piston assembly which form two working chambers to either of which fluid under pressure can be supplied to effect relative axial movement of the piston and cylinder, said unit being carried on a double purpose bearing which serves to couple the unit to the lathe spindle and wherein the movable member of said assembly is mounted on a second double purpose bearing which couples said member to the draw tube so that axial movement imparted to said member by the admittance of pressure fluid to either of said working chambers is transmitted to the draw tube to operate the chuck. The present invention has for its object to provide an improved unit to actuate the draw tube of chucking equipment of the kind set forth which will be more compact and will have a smaller overhang than such units constructed as has been previously proposed.

According to the present invention lathe chucking equipment of the kind in which the chuck is rotated by a tubular lathe spindle and caused to grip and release the workpiece by the operation of a draw tube extending axially through the bore of the lathe spindle is provided with a unit to actuate the draw tube comprising a cylinder, a piston within the cylinder, a tubular piston rod carrying the piston and extending axially from each face thereof, a sleeve encircling the draw tube towards one end of the unit, which sleeve is operatively connected to the end of the lathe spindle to rotate therewith and is incapable of axial movement, a double purpose bearing having inner and outer races introduced between the sleeve and that part of the tubular piston rod which extends from one face of the piston, means by which the inner and outer races are prevented from axial movement relative to the sleeve and piston rod respectively so that the piston cannot move axially relative to the lathe spindle, a flanged housing at the other end of the unit and secured to the cylinder to extend into the part of the tubular piston rod extending from the other face of the piston, a double purpose bearing having inner and outer races introduced between said housing and the draw tube, and means by which the inner and outer races are prevented from axial movement relative to the draw tube and cylinder respectively, the cylinder and therefore also the draw tube being displaced relative to the piston and lathe spindle to actuate the chuck when pressure fluid is introduced into the cylinder on either side of the piston. A preferred embodiment of the invention will now be described with reference to the accompanying drawing which is a sectional elevation thereof.

In the drawings 10 denotes a hollow lathe spindle through which extends a draw tube 12. The chuck is not shown because it may be of any known construction which grips and releases the workpiece when an axial movement is transmitted to the draw tube in the appropriate direction.

The means for imparting axial movement to the draw tube 12 consists of a unit which embodies a cylinder 13 and a piston 11 working therein and forming working chambers 14 and 15 located one on each side thereof. Compressed air is supplied to said chambers 14 and 15 in the cylinder. Any suitable valve means is provided to control the inlet of the air to either of said chambers as may be required. It will be understood that when compressed air is being supplied to one of said chambers by post 14 or 15a spent air is being exhausted from the other chamber.

The unit also includes two double purpose anti-friction bearings 16 and 17. A double purpose bearing is one that takes end thrust and also constitutes a journal bearing. Bearings 16 has an inner race 16a and an outer race 16b and bearing 17 has an inner race 17a and an outer race 17b.

Fitted on and keyed to the back end of the lathe spindle 10 is the inner flanged end of a sleeve 18, the flange being bolted to a collar 19 which is screwed on to the lathe spindle. The sleeve is recessed to receive the inner race 16a of the double purpose bearing 16, this race being held on the sleeve to prevent axial movement thereof by a retaining collar 20 fast on the sleeve.

The piston 11 is carried by a tubular piston rod extending axially as at 21 from one face of the piston and extending axially as at 22 from the other face thereof.

The part 21 of the piston rod slides within a bore 22a formed in closure member 22b which forms the inner end of the working chamber 15, the closure member being bolted to the cylinder 13. Bolted to the outer end of the closure member is a ring 22c which closes the outer end of the bore 22a.

The piston has an internal annular shoulder 23 against which abuts one side of the outer race 16b of the double purpose bearing 16, a retaining ring 24 screwed into the inner end of the piston rod 21, i.e. the end nearer to the lathe spindle, abutting against the other side of said race.

The lathe spindle is incapable of axial movement and as the sleeve 18 is secured to said spindle and the inner race 16a is prevented from axial movement on the sleeve the double purpose bearing prevents axial movement of the piston rod 21 and the piston 11.

The outer end of the chamber 14 is closed by the flanged end 13b of the cylinder 13, the cylinder being extended axially as at 13c. To said extension is bolted a combined end cover and housing 25 and in said housing is inserted the outer race 17b of the double purpose bearing 17 which is retained in place by means of a retaining ring 25a screwed into the inner end of the housing. The inner race 17a is mounted on an annular spacer 26 encircling the draw tube this race being incapable of axial movement relative to the draw tube by means of outer and inner retaining rings 27 and 28 both of which are screwed on to the draw tube.

The hollow piston rod 22 is accommodated in the annular space formed between housing 25 and the flanged end of the cylinder and its extension.

The lathe spindle is mounted on the lathe so that it cannot partake of an axial movement and is driven through any suitable gearing.

It will be seen that the draw tube can rotate freely but it is coupled to the cylinder 13 so as to be incapable of relative axial movement. The cylinder is however capable of axial movement relative to the fixed piston rod 22 and piston 13a and is coupled to the draw tube.

To cause the chuck to grip the workpiece introduced through the draw tube compressed air is admitted to the chamber 14 by which the cylinder 13 is moved to the left, as viewed in FIGURE 1, the pistoin remaining stationary. As the cylinder is coupled to the draw tube through the double purpose bearing 17 a like movement is transmitted to the draw tube which causes the chuck to grip the workpiece.

To thereafter release the jaws pressure fluid is admitted to the chamber 15 whereon the cylinder moves to the right and in doing so it transmits a corresponding movement to the draw tube. As shown in the drawing the unit is very compact and therefore forms a small overhang at the end of the lathe spindle.

It will be noted there is no running joint, and that the rotating mass consists of the lathe spindle, the draw tube, sleeve and the rotating races of the double acting bearings. The cylinder, piston, piston rods and outer races do not rotate.

The chuck may be of known construction. For example it may be provided with slides carrying jaws which are moved axially by means of a wedge plunger secured to the draw tube. Or it may be in the form of a spring or segmental collet or a lever operated jaw chuck which grips and releases the workpiece by the axial movement of the draw tube.

What I claim is:
1. Lathe chucking equipment of the kind in which the chuck is rotated by a tubular lathe spindle and caused to grip and release the workpiece by the operation of a draw tube extending axially through the bore of the lathe spindle provided with a unit to actuate the draw tube comprising a cylinder, a tubular piston rod carrying the piston and extending axially from each face thereof, a sleeve encircling the draw tube towards one end of the unit, which sleeve is operatively connected to the end of the lathe spindle to rotate therewith and is incapable of axial movement, a double purpose bearing having inner and outer races introduced between the sleeve and that part of the tubular piston rod which extends from one face of the piston, means by which the inner and outer races are prevented from axial movement relative to the sleeve and piston rod respectively so that the piston cannot move axially relative to the lathe spindle, a flanged housing at the other end of the unit and secured to the cylinder to extend into the part of the tubular piston rod extending from the other face of the piston, a double purpose bearing having inner and outer races introduced be between said housing and the draw tube, and means by which the inner and outer races are prevented from axial movement relative to the draw tube and cylinder respectively, the cylinder and therefore also the draw tube being displaced relative to the piston and lathe spindle to actuate the chuck when pressure fluid is introduced into the cylinder on either side of the piston.

References Cited

UNITED STATES PATENTS

| | | | |
|---|---|---|---|
| 2,546,326 | 3/1951 | Wetzel | 279—4 |
| 2,782,044 | 2/1957 | Gabriel | 279—4 |
| 2,886,007 | 5/1959 | Manchester | 279—4 X |

ROBERT C. RIORDON, *Primary Examiner.*

J. C. PETERS, *Assistant Examiner.*

U.S. Cl. X.R.

92—117